United States Patent
McCune

(10) Patent No.: US 8,333,678 B2
(45) Date of Patent: Dec. 18, 2012

(54) EPICYCLIC GEAR SYSTEM WITH LOAD SHARE REDUCTION

(75) Inventor: Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 700 days.

(21) Appl. No.: 12/492,501

(22) Filed: Jun. 26, 2009

(65) Prior Publication Data

US 2010/0331140 A1 Dec. 30, 2010

(51) Int. Cl.
*F16H 57/08* (2006.01)
*F16C 33/02* (2006.01)

(52) U.S. Cl. ........ 475/331; 475/346; 475/347; 384/276; 384/280

(58) Field of Classification Search ........... 475/331, 475/346, 347; 384/276, 280
See application file for complete search history.

(56) References Cited

U.S. PATENT DOCUMENTS

| | | | |
|---|---|---|---|
| 2,127,463 A * | 8/1938 | Chilton | 475/347 |
| 3,257,869 A * | 6/1966 | Sharples | 475/347 |
| 5,102,379 A | 4/1992 | Pagluica et al. | |
| 5,391,125 A * | 2/1995 | Turra et al. | 475/346 |
| 5,433,674 A | 7/1995 | Sheridan et al. | |
| 6,223,616 B1 | 5/2001 | Sheridan | |
| 6,964,155 B2 * | 11/2005 | McCune et al. | 60/226.1 |
| 7,021,042 B2 | 4/2006 | Law | |
| 2007/0225111 A1 | 9/2007 | Duong et al. | |
| 2008/0116010 A1 | 5/2008 | Portlock et al. | |

FOREIGN PATENT DOCUMENTS

| | | |
|---|---|---|
| EP | 1435475 A2 | 7/2004 |
| EP | 1925855 A2 | 5/2008 |

OTHER PUBLICATIONS

Extended European Search Report, Mar. 2, 2011, 6 pages.

* cited by examiner

*Primary Examiner* — Tisha Lewis

(74) *Attorney, Agent, or Firm* — Kinney & Lange, P.A.

(57) ABSTRACT

A journal bearing includes a main body and a connection portion. The main body extends radially outward from a central cavity to an interface surface. The connection portion supports an end of the main body and extends radially around the central cavity. The connection portion has a dimension selected as a proportion of a reference dimension of the main body to achieve a desired spring rate for the journal bearing.

18 Claims, 4 Drawing Sheets

US 8,333,678 B2

EPICYCLIC GEAR SYSTEM WITH LOAD SHARE REDUCTION

BACKGROUND

The present invention relates to gas turbine engines, and more particularly, to an epicyclic gear system for use in gas turbine engines.

Epicyclic gear trains are complex mechanisms for reducing or increasing the rotational speed between two rotating shafts or rotors. The compactness of planetary or star system gear trains makes them appealing for use in aircraft engines.

The forces and torque transferred through an epicyclic gear train place tremendous stresses on the gear train components, making them susceptible to breakage and wear. For example, the longitudinal axes of an epicyclic gear train's sun gear, star gear, and ring gear are ideally parallel with the longitudinal axis of an external shaft that rotates the sun gear. Unfortunately, many components in the epicyclic gear train are generally not effectively aligned due to numerous factors including imbalances in rotating hardware, manufacturing imperfections, and transient flexure of shafts and support frames due to aircraft maneuvers. Due to the rarity of coaxial alignment, each star gear transfers varying amounts of torque and loads from the sun gear to the ring gear. To account for these varying amounts of torque on the star gears, one must design each star gear and its corresponding journal bearing (which mounts the star gear to a gear carrier) to carry greater torque than the average torque on all the star gears/journal bearings combined. Typically, each star gear and its corresponding journal bearing are designed to withstand a torque of about 37 percent higher than the mean torque across all the star gears. Unfortunately, by designing each journal bearing and star gear to withstand torque about 37 percent higher than the mean torque one must sacrifice epicyclic gear system size and weight. This leads to greater epicyclic gear system size and weight in the aircraft engine. Additionally, precise journal bearing and star gear tolerances are required to achieve the 37 percent design factor, increasing overall manufacturing cost of the epicyclic gear system.

SUMMARY

According to the present invention, a journal bearing includes a main body and a connection portion. The main body extends radially outward from a central cavity to an interface surface. The connection portion supports an end of the main body and extends radially around the central cavity. The connection portion has a dimension selected as a proportion of a reference dimension of the main body to achieve a desired spring rate for the journal bearing.

DETAILED DESCRIPTION

Figure 1:
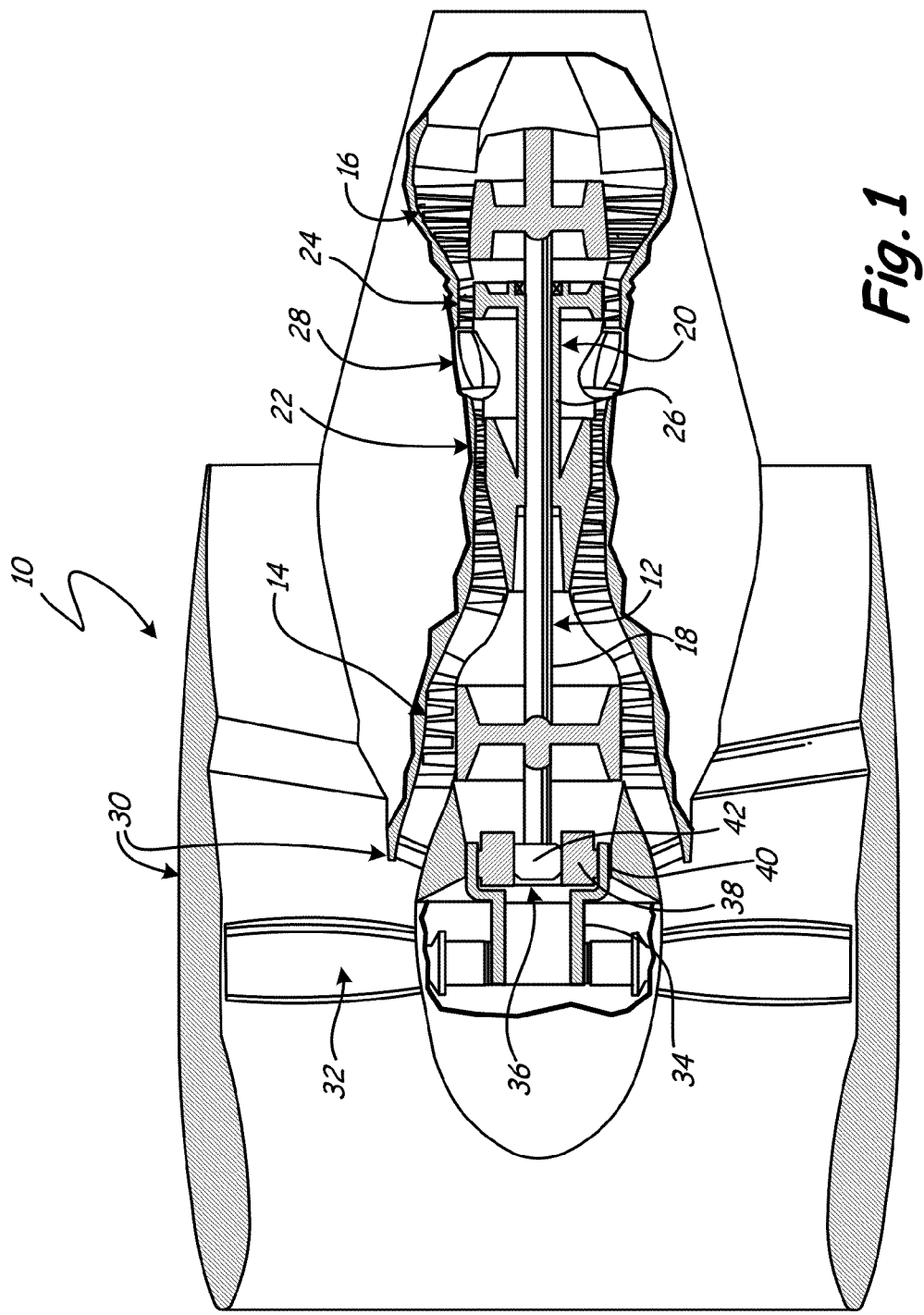
FIG. 1 is a schematic cross-sectional side view of a gas turbine engine with an epicyclic gear system.

FIG. 1 is a schematic cross-sectional side view of gas turbine engine 10. Gas turbine engine 10 includes low pressure unit or pack 12 (which includes low pressure compressor 14 and low pressure turbine 16 connected by low pressure shaft 18), high pressure unit or pack 20 (which includes high pressure compressor 22 and high pressure turbine 24 connected by high pressure shaft 26), combustor 28, nacelle 30, fan 32, fan shaft 34, and epicyclic gear system 36. The epicycle gear system 36 includes star gear 38, ring gear 40, and sun gear 42. The general construction and operation of gas turbine engines is well-known in the art.

As shown in FIG. 1, low pressure unit 12 is coupled to fan shaft 34 via epicyclic gear system 36. Sun gear 42 is attached to and rotates with low pressure shaft 18. Sun gear 42 is rotatably mounted on low pressure shaft 18. Ring gear 40 is connected to fan shaft 34 which turns at the same speed as fan 32. Star gear 38 is enmeshed between sun gear 42 and ring gear 40 such that star gear 38 rotates when sun gear 42 rotates. Star gear 38 is rotatably mounted on the stationary gear carrier (not shown) by stationary journal bearing (not shown). When low pressure unit 12 rotates, epicyclic gear system 36 causes fan shaft 34 to rotate at a slower rotational velocity than that of low pressure unit 12, but in the opposite direction.

In an alternative embodiment to the embodiment shown in FIG. 1, epicyclic gear system 36 can be configured in a different manner sometimes called a planetary gear system. In this alternative configuration, star or "planet" gear 38 are rotatably mounted on the gear carrier by bearings. Star gear 38 meshes with sun gear 42. Mechanically grounded, internally toothed ring gear 40 circumscribes and meshes with star gear 38. Input and output shafts extend from sun gear 42 and the gear carrier respectively. During operation, the input shaft rotatably drives sun gear 42, rotating star gear 38 about its own axis, and because ring gear 40 is mechanically grounded, causes star gear 38 to orbit sun gear 42 in the manner of a planet. Orbital motion of star gear 38 turns the gear carrier and the output shaft in the same direction as the input shaft, but slower.

The present application describes epicyclic gear system 36 that has a journal bearing geometry and a flexible connection of the journal bearing (not shown) to the gear carrier (not shown) which optimizes torque carrying capacity of star gear 38. In particular, radial thickness of a connection portion of the journal bearing and thickness of the gear carrier (to which the journal bearing is mounted) are optimized to achieve a desired spring rate for the star gear/journal bearing combination that better distributes and balances torque between star gears 38 in epicyclic gear system 36. In this manner, star gear 38 and the journal bearing need only be designed to withstand an average torque of about 10 percent above the mean torque experienced by all star gears 38 in epicyclic gear system 36. By lowering this design factor, epicyclic gear system 36 size and weight can be reduced and the required tolerances for components such as star gears 38 can also be reduced. Additionally, an increase in the ability of epicyclic gear system 36 to withstand shock loads such as those experienced from a bird strike can be achieved by optimizing journal bearing spring rate to provide for a flexible connection between journal bearing and gear carrier.

Figure 2:
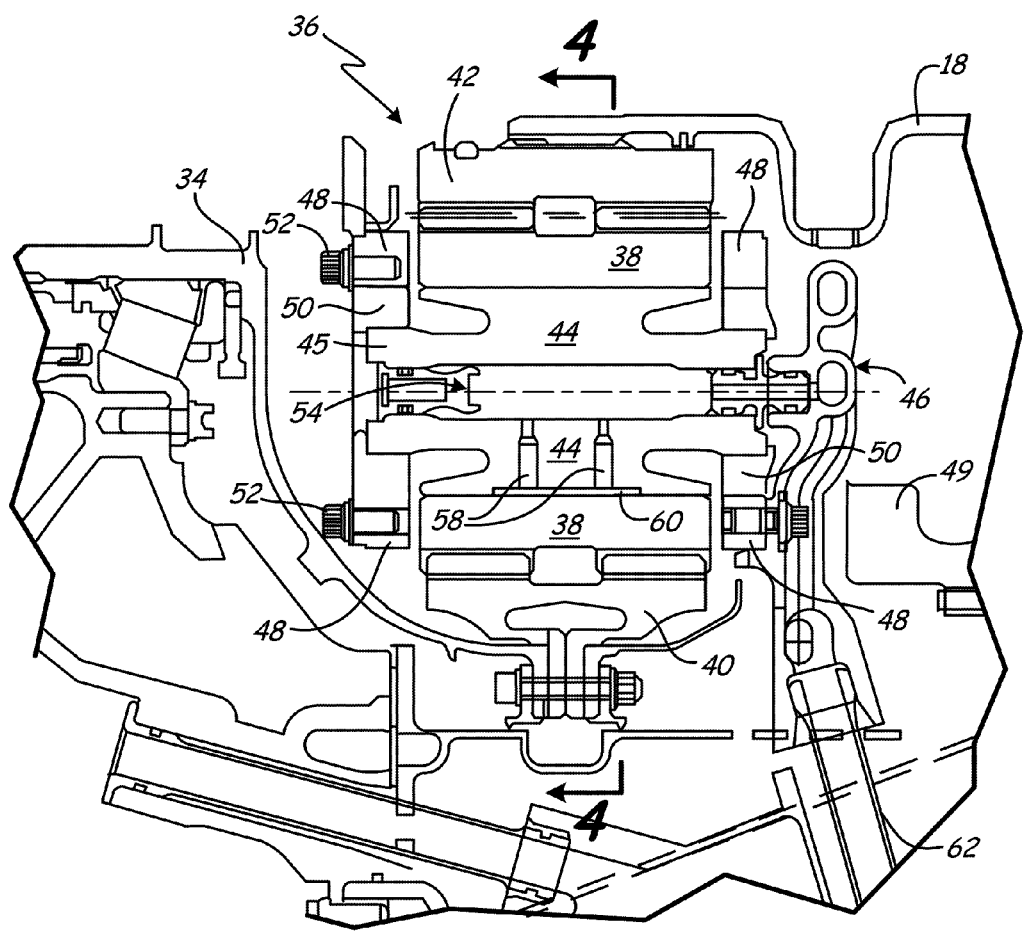
FIG. 2 is a schematic cross-sectional view of one embodiment of the epicyclic gear system of FIG. 1.

FIG. 2 is a cross-sectional view of epicyclic gear system 36 taken through only a single star gear 38. As discussed previously, epicyclic gear system 36 includes multiple star gears arranged circumferentially around sun gear 42. In addition to star gear 38, ring gear 40, and sun gear 42, epicyclic gear system 36 includes journal bearing 44, lubricant manifold 46, carrier 48, torque frame 49, end caps 50, and fasteners 52. Journal bearing 44 includes connection portion 45, axial passage 54, and radial passages 58. Radial passages 58 fluidly connect to distribution recess 60. Lubricant manifold 46 is connected to feed tube 62.

As discussed previously, in one embodiment, low pressure unit 12 (FIG. 1) is coupled to fan shaft 34 via epicyclic gear system 36. Sun gear 42 is attached to and rotates with low pressure shaft 18 (FIG. 1). Sun gear 42 is rotatably mounted on low pressure shaft 18. Carrier 48 is stationarily mounted within gas turbine engine 10 (FIG. 1) by torque frame 49. Carrier 48 has two generally interfacing faces which support the ends of the stationary journal bearing 44. Ring gear 40 is connected to fan shaft 34 (FIG. 1) which turns at the same speed as fan 32 (FIG. 1). Star gear 38 (only one is illustrated although epicyclic gear system 36 includes a set of multiple star gears) is enmeshed between sun gear 42 and ring gear 40 such that star gear 38 rotates when sun gear 42 rotates. Star gear 38 is rotatably mounted on the stationary carrier 48 by journal bearing 44. When low pressure unit 12 rotates, epicyclic gear system 36 causes fan shaft 34 to rotate at a slower rotational velocity than that of low pressure unit 12. The operation of similar epicyclic gear systems and lubrication systems for epicycle gear systems are further detailed in U.S. Pat. Nos. 6,223,616 and 5,102,379, which are herein incorporated by reference.

In the embodiment shown in FIG. 2, stator journal bearing 44 is positioned inside of rotatable star gear 38. Lubricant manifold 46 is disposed adjacent to journal bearing 44 and is fluidly connected thereto. Star gear 38 is rotatably mounted on carrier 48 by bearings. More specifically, star gear 38 is rotatably mounted on carrier 48 by journal bearing 44. End caps 50 are welded or otherwise affixed to connection portions 45 of journal bearing 44 and are press fit into carrier 48. End caps 50 and carrier 48 provide support for journal bearing 44. Fasteners 52 extend through end caps 50 and connect to carrier 48 to act as an anti-rotation feature to keep the journal bearing 44 stationary. As will be discussed subsequently, the radial thickness and axial length of connection portions 45 of the journal bearing 44 and thickness of end caps 50 and/or carrier 48 is optimized to make the spring rate of the star gear 38 and journal bearing 44 combination more effective for distributing and balancing torque between multiple star gears 38 in the epicyclic gear system 36.

Axial passage 54 comprises a central cavity that is fluidly connected to lubricant manifold 46. Lubricant manifold 46 is fed pressurized lubricant from other components of the gas turbine engine via feed tube 62. Liquid lubricant from lubricant manifold 46 is supplied through axial passage 54 to radial passages 58 via means of a hollow configured pin and a fitting which interfaces the pin. After leaving cavity 56, the lubricant flows through radial passages 58 into distribution recess 60 between journal bearing 44 and star gear 38. Distribution recess 60 extends along the exterior surface of journal bearing 44. The lubricating liquid forms a film of lubrication on journal bearing 44 in the distribution recess 60. From distribution recess 60 the film of lubrication spreads circumferentially and axially due to viscous forces between star gear 38 and journal bearing 44. The lubricant film helps to support star gear 38 and reduce friction between the interior surface of star gear 38 and the exterior surface of journal bearing 44 as star gear 38 rotates. To ensure adequate thickness of the lubricant film, the rate the lubricant is fed to the external surface of the journal bearing 44 varies and is determined by the pressure profile and temperature at the interface between star gears 38 and journal bearings 44. In one embodiment, the flow rate of the lubricant provides the external surface of journal bearing 44 with a minimum lubricant film thickness of between about 0.0254 mm (100 micro inches) and 0.0508 mm (2000 micro inches).

Journal bearing 44 and star gear 38 are typically made of steel. Both can be made of the same steel, with journal bearing 44 and star gear 38 typically case-hardened by carburization. Commonly used steels include AMS 6265 and AMS 6308. The outer surface of journal bearing 44 and the interfacing inner surface of the star gear 38 can be covered with or formed by a bearing material such as a soft metal coating or solid film coating material.

Figure 3:
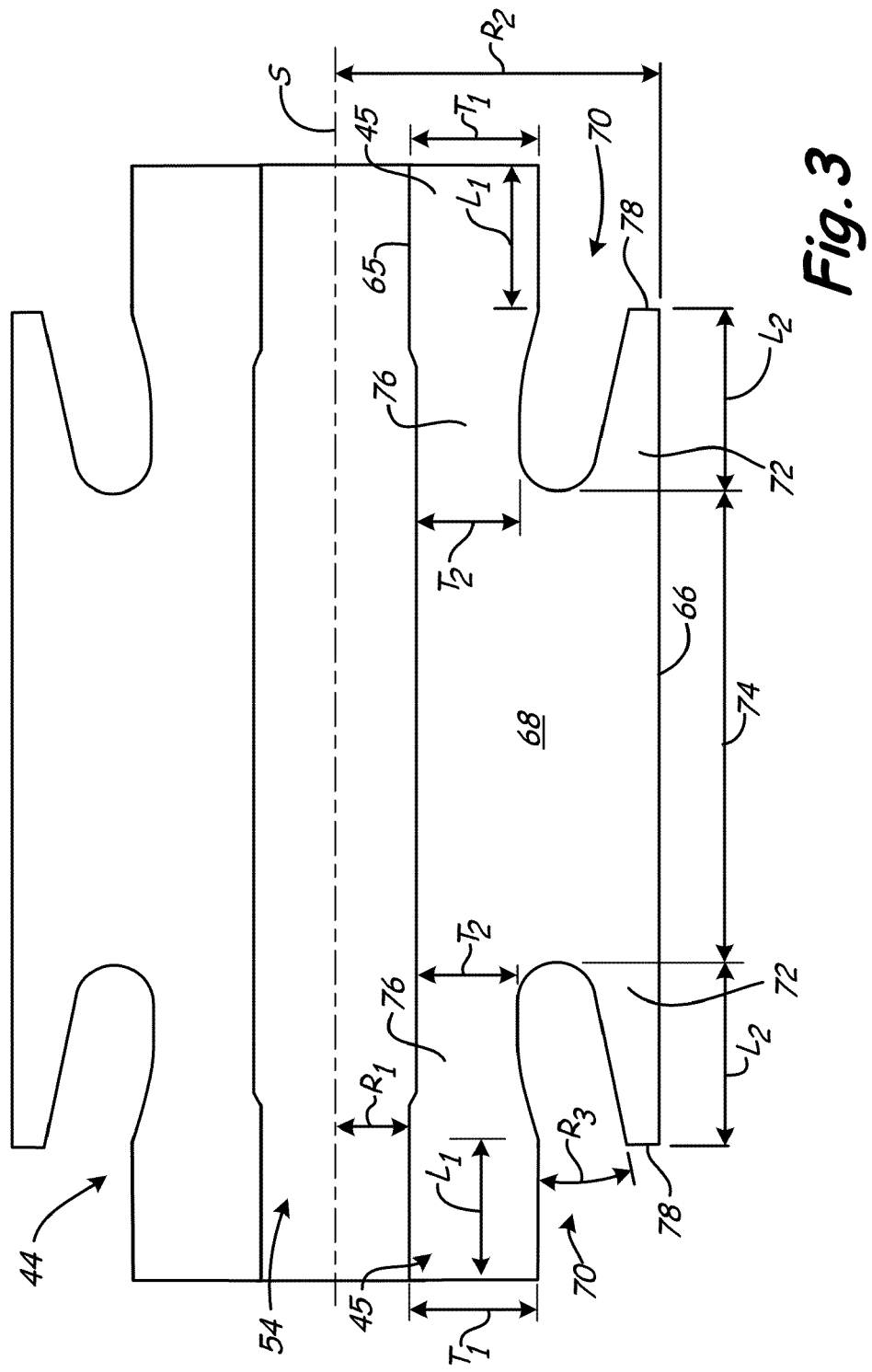
FIG. 3 is a schematic cross-sectional view of a journal bearing showing the geometry of the journal bearing in non-dimensionalized units.

FIG. 3 shows a schematic cross-sectional view of journal bearing 44 showing the geometry of the journal bearing. As will be discussed subsequently, in one embodiment outer surface 66 of journal bearing 44 serves as a reference dimension from which the other features of journal bearing 44 can be non-dimensionally measured. In addition to the connection portions 45 and axial passage or cavity 54, journal bearing 44 includes main body 68 and grooves 70. Main body 68 includes inner radial surface 65, outer surface 66, cantilever portions 72, and merged portion 74. Connection portions 45 include necked regions 76. Cantilever portions 72 include lip 78.

Connection portions 45 extend from both axial ends of the journal bearing 44. Connection portions 45 are supported by opposing sides of carrier 48 (FIG. 2), and in some embodiments such as the one illustrated in FIG. 3, are received by end caps 50 which fit into either side of carrier 48. Thus, end caps 50 and/or carrier 48 provide a support unit for journal bearing 44 (FIG. 2).

Connection portions 45 have necked regions 76 which connect connection portions 45 to main body 68. Main body 68 extends radially around axis of symmetry S. Inner radial surface 65 of main body defines axial passage or cavity 54. Outer surface 66 of main body 68 serves as the interface between journal bearing 44 and star gear 38 (FIG. 2). Outer surface 66 can also serve as reference dimension from which other features of journal bearing 44 can be non-dimensionally measured. Main body 68 and outer surface 66 can be divided into cantilever portions 72 and merged portion 74. Cantilever portions 72 extend axially from central merged portion 74 toward the ends of journal bearing 44. Lip 78 is the axial end portion of cantilever portions 72. Cantilever portions 72 derive their names from grooves 70 which are disposed radially inward of cantilever portions 72. Grooves 70 separate cantilevered portions 72 from connection portions 45.

The geometry of journal bearing 44, in particular connection portions 45, grooves 70, cantilever portions 72 and merged portion 74, are selected such that the resultant geometry of outer surface 66 approaches a straight line in the axial direction. In this manner, a more uniform pressure profile and temperature approximate outer surface 66 (the interface between star gears 38 and journal bearings 44) can be maintained during operation.

In one embodiment, the length of outer surface 66 between lips 78 provides the reference dimension for the remaining features of journal bearing 44. In this embodiment, if outer surface 66 is given a non-dimensionalized length of 1.0 the following non-dimensional units (discussed subsequently) would apply to the features of the journal bearing 44. Specifically, when outer surface 66 is the reference dimension, axial passageway 54 has a radius $R_1$ (measured from axis of symmetry S to inner surface 65 of connection portions 45) of between about 0.10 and 0.30 (about 10 to 30 percent of the length of outer surface 66). The radius $R_2$ of main body 68 (from axis of symmetry S to outer surface 66) of journal bearing 44 is between about 0.65 and 0.85 (about 65 to 85 percent of the length of outer surface 66). Radial thickness $T_1$ of each connection portion 45 (measured from inner surface 65 to outer radial surface of connection portion 45) is between about 0.2 and 0.3 (about 20 to 30 percent of the length of outer surface 66). Axial length $L_1$ of each connection portion 45 (excluding necked region 76) is between about 0.1 and 0.3 (about 10 to 30 percent of the length of outer surface 66). Radial thickness $T_2$ each necked region 76 is between about 0.10 and 0.20 (about 10 to 20 percent of the length of outer surface 66). Each cantilever portion 72 has a length $L_2$ of between about 10 and 30 percent of the length of the entire outer surface 66. Each lip 78 has as a thickness of between about 3 and 5 percent of the length of the outer surface 66. Grooves 70 have a radius $R_3$ of between about 10° and 20°. It is important to note that other features of journal bearing 44 such as the radial thickness of the main body 68 (from inner surface 65 to outer surface 66) or radius $R_1$ of axial passageway 54 could serve as the reference dimension, and therefore, have non-dimensionalized length of 1.0. If a dimension other than outer surface 66 is selected as the reference dimension and given a non-dimensionalized length of 1.0, the values given for the dimensions above would change and would have to be recalculated as proportions of the selected reference dimension. However, the dimensional size of any feature of journal bearing 44 relative to another feature would remain constant.

Radial thickness $T_1$ and axial length $L_1$ of connection portions 45 are of particular importance for determining the spring rate of journal bearing 44, and hence, the combination of journal bearing 44 and star gear 38 (FIG. 2). The range given (about 20 to 30 percent of the length of outer surface 66) for the radial thickness $T_1$ represents the optimal radial thickness for connection portions 45 to achieve a desired spring rate for the journal bearing 44. This desired spring rate more effectively distributes and balances torque between star gears 38 (FIG. 2) in epicyclic gear system 36 (FIG. 2). In one embodiment, the desired tangential spring rate for the journal bearing 44 is between about 6.0E6 lb/in (1.05E9 N/m) and about 15.0E6 lb/in (2.63E9 N/m). Additionally, as will be discussed subsequently, the range given for axial length $L_1$ (about 10 to 30 percent of the length of outer surface 66) of connection portions 45 (excluding necked region 76) represents the optimal thickness of carrier 48 or the combination of carrier 48 and end caps 50, to achieve more effective distribution and balance of torque between star gears 38 (FIG. 2) in epicyclic gear system 36 (FIG. 2). Axial length $L_1$ is important for optimizing the distribution and balance of torque between the star gears 38 (FIG. 2) because it approximates a fronting thickness of carrier 48 (FIG. 2) or the combination of carrier 48 and end caps 50. The fronting thickness is the distance the carrier 48 interfaces with connection portion 45. By increasing or decreasing the fronting thickness one can vary the amount of deflection in carrier 48 or combination of carrier 48 and end caps 50, and hence, increase or decrease the spring rate of journal bearing 44 mounted therein to achieve the desired spring rate. Because journal bearing 44 is supported on both axial ends by carrier 48 or the combination of carrier 48 and end caps 50, the thickness of carrier 48 or the combination of carrier 48 and end caps 50 contributes to the spring rate of journal bearing 44, and hence, to the spring rate of the combination of journal bearing 44 and star gear 38 (FIG. 2). By optimizing the spring rate of the combination of journal bearing 44 and star gear 38, one can achieve better distribution and balance of torque between star gears 38 in epicyclic gear system 36. By more effectively distributing and balancing torque, the size, weight, and rate of wear in epicyclic gear system 36 can be reduced. Additionally, other benefits (some discussed previously) can be achieved by optimizing the geometry of journal bearing 44 and carrier 48 (or carrier 48 and end cap 50 combination) as disclosed herein.

Figure 4:
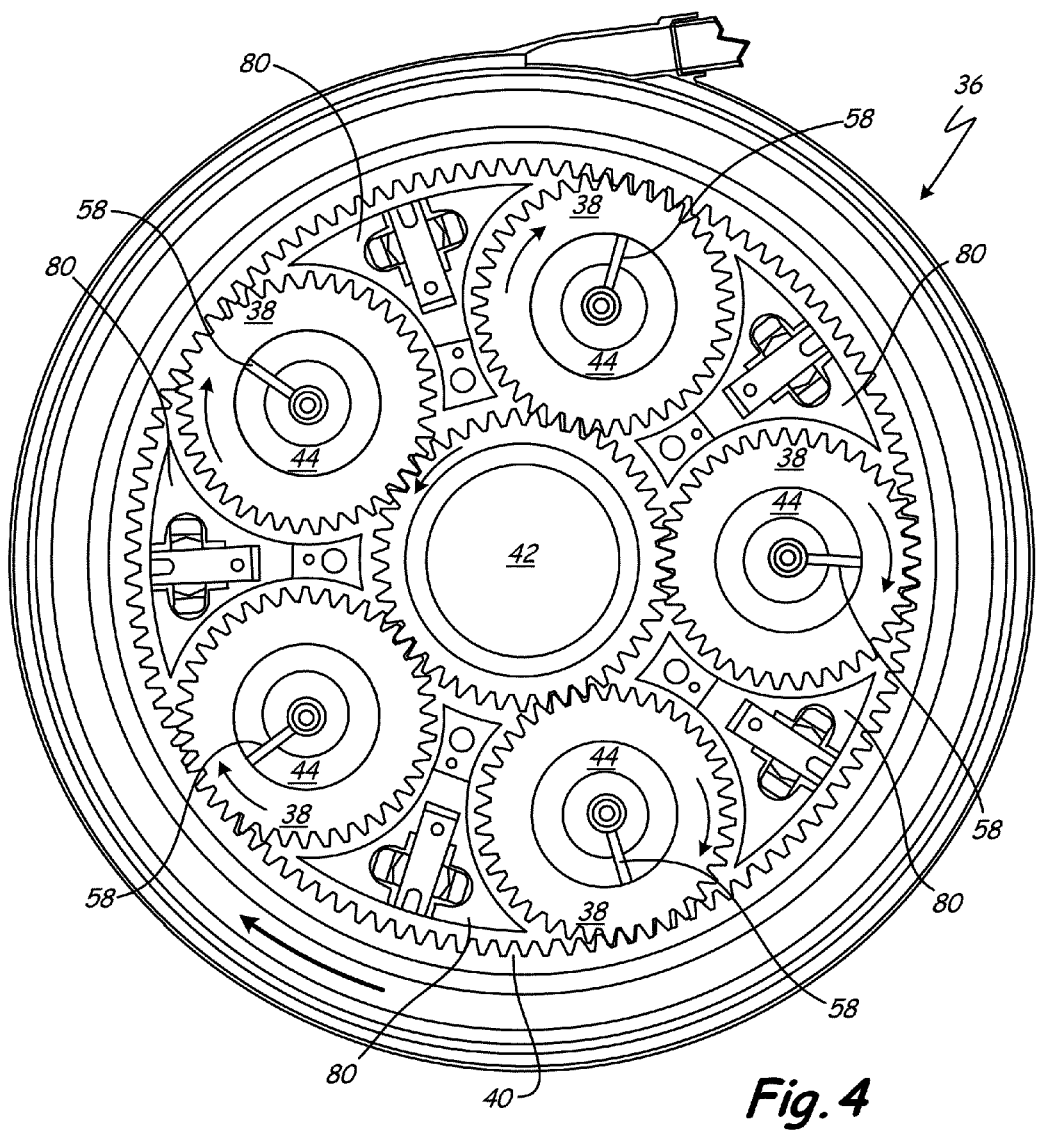
FIG. 4 is a diagrammatic view of the entire epicyclic gear system taken along section 4-4 of FIG. 2.

FIG. 4 shows a schematic, view of the entire epicyclic gear system 36 taken along section 4-4 of FIG. 2. Because FIG. 4 shows the entire epicycle gear system 36 a plurality of star gears 38 are illustrated. These star gears 38 are mounted on carrier 48 (not shown) by a plurality of journal bearings 44. In addition to the components previously discussed the epicyclic gear system 36 includes baffles or spray bars 80.

As discussed previously with reference to FIG. 2, lubricant introduced into the journal bearing/star gear interface spreads axially and circumferentially to form a load supporting lubricant film between journal bearing 44 outer surface and star gear 38 inner surface. After forming a film between journal bearing 44 and star gear 38, lubricant is discharged from the axial extremities of the bearing interface. Substantially all of the discharged lubricant is directed into the sun/star mesh, partly because of the presence of the nearby baffle 80. The directed lubricant cools and lubricates the sun and star gear teeth and then is expelled from the sun/star mesh. The adjacent baffle 80 then guides substantially all of the expelled lubricant radially outwardly into the star/ring mesh. The lubricant is then ejected from the star/ring mesh and centrifugally channeled away from epicyclic gear system 36.

Optimized radial thickness $T_1$ (FIG. 3) of journal bearing 44 and thickness of carrier 48 (FIG. 2) or the combination of carrier 48 and end caps 50 interfacing axial length $L_1$ (FIG. 3) creates a spring rate that allows star gears 38 (and journal bearings 44) to shift circumferentially around sun gear 42 to more effectively balance torque. The amount of this circumferential movement around the sun gear 42 is between about 0.051 mm (0.002 inches) and about 0.127 mm (0.005 inches) and is small enough such that star gears 38 do not come into contact with adjacent baffle 80. In this manner, each star gear 38 and journal bearing 44 need only be designed to withstand an average torque of about 10 percent above the mean torque experienced by all star gears 38 in epicyclic gear system 36. This 10 percent above the mean torque design factor allows epicyclic gear system 36 size and weight to be reduced and the required tolerances for components such as star gears 38 can also be reduced. Additionally, an increase in the ability of epicyclic gear system 36 to withstand shock loads such as those experienced from a bird strike is also achieved.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A journal bearing comprising:
   a main body extending radially outward from a central cavity to an interface surface; and
   a connection portion extending axially from the main body at an end thereof and extending radially about the central cavity, wherein the connection portion has a dimension selected as a proportion of a reference dimension of the main body to achieve a desired spring rate for the journal bearing, and wherein the reference dimension is a total length of the interface surface of the main body, wherein the dimension selected is a radial thickness of the connection portion and the radial thickness is proportionally between about 0.20 and 0.30 of the total length of the interface surface of the main body.

2. A journal bearing comprising:
a main body extending radially outward from a central cavity to an interface surface; and
a connection portion extending axially from the main body at an end thereof and extending radially about the central cavity, wherein the connection portion has a dimension selected as a proportion of a reference dimension of the main body to achieve a desired spring rate for the journal bearing, and wherein the reference dimension is a total length of the interface surface of the main body, wherein a radial thickness of the main body is proportionally between about 0.65 and 0.85 of the total length of the interface surface of the main body.

3. The journal bearing of claim 2, wherein the central cavity has a radius proportionally between about 0.10 and 0.30 of the total length of the interface surface of the main body.

4. A journal bearing comprising:
a main body extending radially outward from a central cavity to an interface surface; and
a connection portion extending axially from the main body at an end thereof and extending radially about the central cavity, wherein the connection portion has a dimension selected as a proportion of a reference dimension of the main body to achieve a desired spring rate for the journal bearing, and wherein the reference dimension is a total length of the interface surface of the main body, and wherein the dimension selected is an axial length of the connection portion and the axial length is proportionally between about 0.10 and 0.30 of the total length of the interface surface of the main body.

5. The journal bearing of claim 4, further comprising a support unit disposed adjacent the journal bearing and adapted to receive the connection portion wherein a thickness of the support unit receiving the connection portion is proportionally between about 0.10 and 0.30 of the total length of the interface surface of the main body.

6. The journal bearing of claim 5, wherein the thickness of the support unit receiving the connection portion corresponds to the axial length of the connection portion and is proportionally between about 0.10 and 0.30 of the total length of the interface surface of the main body.

7. The journal bearing of claim 4, wherein the desired spring rate is between about 6.0E6 lb/in (1.05E9 N/m) and about 15.0E6 lb/in (2.63E9 N/m).

8. An epicyclic gear assembly, comprising:
an assembly having a ring gear, sun gear, and at least one star gear enmeshed between the ring gear and sun gear;
a carrier disposed adjacent the rotatable sun gear and star gear; and
a journal bearing disposed within each star gear and supported by the carrier via a connection portion, the journal bearing having a main body extending radially outward from a central cavity to an interface surface which interfaces with the star gear;
wherein the connection portion has a dimension selected as a proportion of a reference dimension of the main body to achieve a desired spring rate for the journal bearing and star gear such that the assembly more effectively distributes and balances torque, and wherein the reference dimension is a total length of the interface surface of the main body, wherein the dimension selected is a radial thickness of the connection portion and the radial thickness is proportionally between about 0.20 and 0.30 of the total length of the interface surface of the main body.

9. An epicyclic gear assembly, comprising:
an assembly having a ring gear, sun gear, and at least one star gear enmeshed between the ring gear and sun gear;
a carrier disposed adjacent the rotatable sun gear and star gear; and
a journal bearing disposed within each star gear and supported by the carrier via a connection portion, the journal bearing having a main body extending radially outward from a central cavity to an interface surface which interfaces with the star gear;
wherein the connection portion has a dimension selected as a proportion of a reference dimension of the main body to achieve a desired spring rate for the journal bearing and star gear such that the assembly more effectively distributes and balances torque, and wherein the reference dimension is a total length of the interface surface of the main body, wherein a radial thickness of the main body is proportionally between about 0.65 and 0.85 of the total length of the interface surface of the main body.

10. The assembly of claim 9, wherein the central cavity has a radius proportionally between about 0.10 and 0.30 of the total length of the interface surface of the main body.

11. An epicyclic gear assembly, comprising:
an assembly having a ring gear, sun gear, and at least one star gear enmeshed between the ring gear and sun gear;
a carrier disposed adjacent the rotatable sun gear and star gear; and
a journal bearing disposed within each star gear and supported by the carrier via a connection portion, the journal bearing having a main body extending radially outward from a central cavity to an interface surface which interfaces with the star gear;
wherein the connection portion has a dimension selected as a proportion of a reference dimension of the main body to achieve a desired spring rate for the journal bearing and star gear such that the assembly more effectively distributes and balances torque, and wherein the reference dimension is a total length of the interface surface of the main body, and wherein the dimension selected is an axial length of the connection portion and the axial length is proportionally between about 0.10 and 0.30 of the total length of the interface surface of the main body.

12. The assembly of claim 11, wherein the carrier receives the connection portion and a thickness of the carrier interfacing with the axial length of the connection portion is proportionally between about 0.10 and 0.30 of the total length of the interface surface of the main body.

13. The assembly of claim 12, wherein the thickness of the carrier interfacing the axial length of the connection portion is a thickness of an end cap connected to the carrier.

14. The assembly of claim 11, wherein the journal bearing and star gear are capable of withstanding an operational torque on average of about 10 percent above the mean torque experienced by all star gears in the assembly.

15. The assembly of claim 11, wherein the desired spring rate of the journal bearing is between about 6.0E6 lb/in (1.05E9 N/m) and about 15.0E6 lb/in (2.63E9 N/m).

16. An epicyclic gear assembly, comprising:

an assembly having a ring gear, sun gear, and at least one star gear enmeshed between the ring gear and sun gear;

a carrier disposed adjacent the rotatable sun gear and star gear; and a journal bearing disposed within each star gear and supported by the carrier via a connection portion, the journal bearing having a main body extending radially outward from a central cavity to an inerface surface which interfaces with the star gear, the connection portion having a radial thickness proportionally between about 0.20 and 0.30 of a total length of the interface surface of the main body.

17. The journal bearing of claim 1, wherein the central cavity has a radius proportionally between about 0.10 and 0.30 of the total length of the interface surface of the main body.

18. The assembly of claim 8, wherein the central cavity has a radius proportionally between about 0.10 and 0.30 of the total length of the interface surface of the main body.

* * * * *

UNITED STATES PATENT AND TRADEMARK OFFICE
CERTIFICATE OF CORRECTION

| | | |
|---|---|---|
| PATENT NO. | : 8,333,678 B2 | Page 1 of 1 |
| APPLICATION NO. | : 12/492501 | |
| DATED | : December 18, 2012 | |
| INVENTOR(S) | : Michael E. McCune | |

It is certified that error appears in the above-identified patent and that said Letters Patent is hereby corrected as shown below:

Col. 9, Line 10
  Delete "inerface"
  Insert --interface--

Signed and Sealed this
Twelfth Day of March, 2013

Teresa Stanek Rea
*Acting Director of the United States Patent and Trademark Office*